(12) United States Patent
Corless

(10) Patent No.: US 6,728,773 B1
(45) Date of Patent: Apr. 27, 2004

(54) SYSTEM FOR CONTROLLING AND REGULATING DISTRIBUTION OF INTELLECTUAL PROPERTIES USING INTERNET PROTOCOL FRAMEWORK

(75) Inventor: Peter P. Corless, Mountain View, CA (US)

(73) Assignee: Cisco Technology Inc., San Jose, CA (US)

(*) Notice: Subject to any disclaimer, the term of this patent is extended or adjusted under 35 U.S.C. 154(b) by 0 days.

(21) Appl. No.: 09/568,647

(22) Filed: May 10, 2000

(51) Int. Cl.⁷ .................. G06F 15/16; H04N 7/167
(52) U.S. Cl. .................. 709/229; 380/201; 380/202
(58) Field of Search .................. 713/200, 182, 713/151; 380/201, 202; 709/201, 229

(56) References Cited

U.S. PATENT DOCUMENTS

| | | | |
|---|---|---|---|
| 5,892,900 A | 4/1999 | Ginter et al. | 395/186 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,943,422 A | 8/1999 | Van Wie et al. | 380/9 |
| 5,949,876 A | 9/1999 | Ginter et al. | 380/4 |
| 5,982,891 A | 11/1999 | Ginter et al. | 380/4 |
| 5,983,351 A * | 11/1999 | Glogau | 713/201 |
| 6,052,780 A * | 4/2000 | Glover | 713/193 |
| 6,119,229 A * | 9/2000 | Martinez et al. | 713/200 |
| 6,157,947 A * | 12/2000 | Watanabe et al. | 709/217 |
| 6,170,014 B1 * | 1/2001 | Darago et al. | 709/229 |
| 6,286,036 B1 * | 9/2001 | Rhoads | 709/217 |
| 6,314,409 B2 * | 11/2001 | Schneck et al. | 705/54 |
| 6,385,596 B1 * | 5/2002 | Wiser et al. | 705/51 |
| 6,408,331 B1 * | 6/2002 | Rhoads | 709/217 |
| 6,418,421 B1 * | 7/2002 | Hurtado et al. | 705/54 |
| 6,466,571 B1 * | 10/2002 | Dynarski et al. | 370/352 |
| 6,564,253 B1 * | 5/2003 | Stebbings | 709/217 |
| 2001/0037460 A1 * | 11/2001 | Porrcari | 713/201 |
| 2001/0039587 A1 * | 11/2001 | Uhler et al. | 709/229 |

\* cited by examiner

*Primary Examiner*—Krisna Lim

(57) ABSTRACT

A method and system thereof for controlling and regulating the distribution of intellectual properties using Internet Protocol and a plurality of controlling processes and applications. An intellectual property is assigned a unique digital identifier that provides an address for locating the intellectual property using Internet Protocol. Electronic links are enabled between the intellectual property and other intellectual property elements which establish terms for accessing said intellectual property. A digital feature element can be used to describe features of the intellectual property. A digital rights element can be used to describe the legal rights and limitations associated with the intellectual property. A digital license element can be used to provide a license for the intellectual property.

28 Claims, 5 Drawing Sheets

SYSTEM FOR CONTROLLING AND REGULATING DISTRIBUTION OF INTELLECTUAL PROPERTIES USING INTERNET PROTOCOL FRAMEWORK

TECHNICAL FIELD

The present invention relates to the electronic transfer of information, particularly intellectual property, over computer system networks. More specifically, the present invention pertains to the control and regulation of the distribution of intellectual properties over the Internet.

BACKGROUND ART

Intellectual property can be considered in terms of either its "embodiments" or its "representations." Generally, an embodiment of an intellectual property is the property itself, while a representation of the intellectual property can be data or meta-data either describing or pointing to the property.

For example, intellectual properties such as real-time human communications, stored and forwarded messages, documents or collections, dynamic or persistent data structures and databases, interpretable scripts, source code, and partially or fully compiled programs and applications, as well as other intellectual properties generally referred to as "content," are often described as an embodiment of the intellectual property. Embodiments of intellectual property can also be theoretical or abstract concepts which are exemplified, documented or reified as a specific form of content.

Legal rights, contracts, agreements or other assertions can be embodied in the form of content, but are not the embodiment of the intellectual property itself. Instead, these are considered representations of the intellectual property. Some intellectual properties, such as a deed or title to a home, can be representations of physical or real properties.

Intellectual properties are becoming more and more central to the world economy. In an information economy, discrete or aggregate values are placed on intellectual properties, and the markets for general or specific applications of these properties are huge. For example, the software industry, which has embodiments of intellectual properties in software products and services, and representations of property rights in licenses, legal contracts and agreements, copyrights, trademarks and patents, currently has annual sales rates of over $135 billion per year.

Increasingly, the Internet (or World Wide Web) is the medium of transmission of intellectual properties such as software products and the like. The Internet uses the Internet Protocol to frame, route, and reassemble digital messages. The transaction of intellectual property is a general transfer of data and data communications over the Internet; intellectual property such as software is simply treated as a bit stream in Internet Protocol. On top of the Internet Protocol are specialized transport layer services, such as HTTP (Hypertext Transfer Protocol) or SMTP (Simple Mail Transfer Protocol). Within these, many messages are encoded in markup languages such as XML (Extensible Markup Language), the World Wide Web Consortium (W3C) meta-markup language based on SGML (Standard Generalized Markup Language).

With regard to the protection of intellectual property, the prior art takes a defensive posture that is focused on guarding the intellectual property against unauthorized access, duplication and use. Limitations are placed on the use and distribution of a piece of intellectual property, and various means are used to attempt to enforce these limitations. Oftentimes, the limitations can be easily circumvented, and so enforcement can be difficult and therefore is mostly ineffective.

In addition, while in some cases the prior art may take advantage of the Internet for delivery of intellectual property such as software, the prior art is still encumbered by more traditional mechanisms for conducting the legal and commercial aspects of intellectual property transactions. For example, purchase orders, terms and conditions, license agreements and the like must be negotiated, written, reviewed and approved. These more traditional mechanisms can cause delay in the delivery and use of the intellectual property by a purchaser or licensee, and delay in the receipt of payments or royalties due to a seller or licensor.

Accordingly, what is needed is a method and/or system that can be used to control the identification, negotiation, establishment, and transaction of intellectual properties (embodiments and representations) over the Internet while overcoming the problems discussed above. What is also needed is a method and/or system that satisfies the above need and that can accommodate commonly-accepted legal and financial standards and systems. The present invention provides a novel solution to the above needs.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides the framework for an intellectual property management method and system thereof to control the identification, negotiation, establishment, and transaction of intellectual properties (embodiments and representations) over the Internet, as well as over internal company computer system networks ("Intranets" or the like) or via non-networked devices. The present invention furthermore provides the framework for a method and system thereof that can facilitate the legal and commercial aspects of intellectual property transactions, in order to reduce the delay in the delivery and use of the intellectual property by a purchaser or licensee, and to reduce the delay in the receipt of payments or royalties due to a seller or licensor.

The present embodiment of the present invention provides a method and system thereof for regulating the distribution of intellectual properties using Internet Protocol with controlling processes and applications. Instead of treating the transaction of intellectual properties as a general transfer of data and data communications, in accordance with the present invention the acts of communication and the communicated data itself are treated as forms of intellectual property rights and intellectual properties. The present invention provides a method and system thereof for declaring rights to an intellectual property and for granting those rights to a purchaser or licensee, in order to more effectively protect the property rights of the intellectual property owner.

In the present embodiment of the present invention, an intellectual property is assigned a unique digital identifier that provides an address for locating the intellectual property using Internet Protocol. Electronic links are enabled between the intellectual property and other intellectual property elements which establish terms for accessing said intellectual property.

In one embodiment, a digital feature element can be used to describe features of the intellectual property. In another embodiment, a digital rights element can be used to describe the legal rights and limitations associated with the intellectual property. In yet another embodiment, a digital license element can be used to provide a license for the intellectual property.

In one embodiment, the intellectual property is codified using XML (Extensible Markup Language).

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "assigning," "using," "locating," "enabling," "accessing," "codifying" or the like, refer to actions and processes (e.g., process 400 of FIG. 4) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 1A:
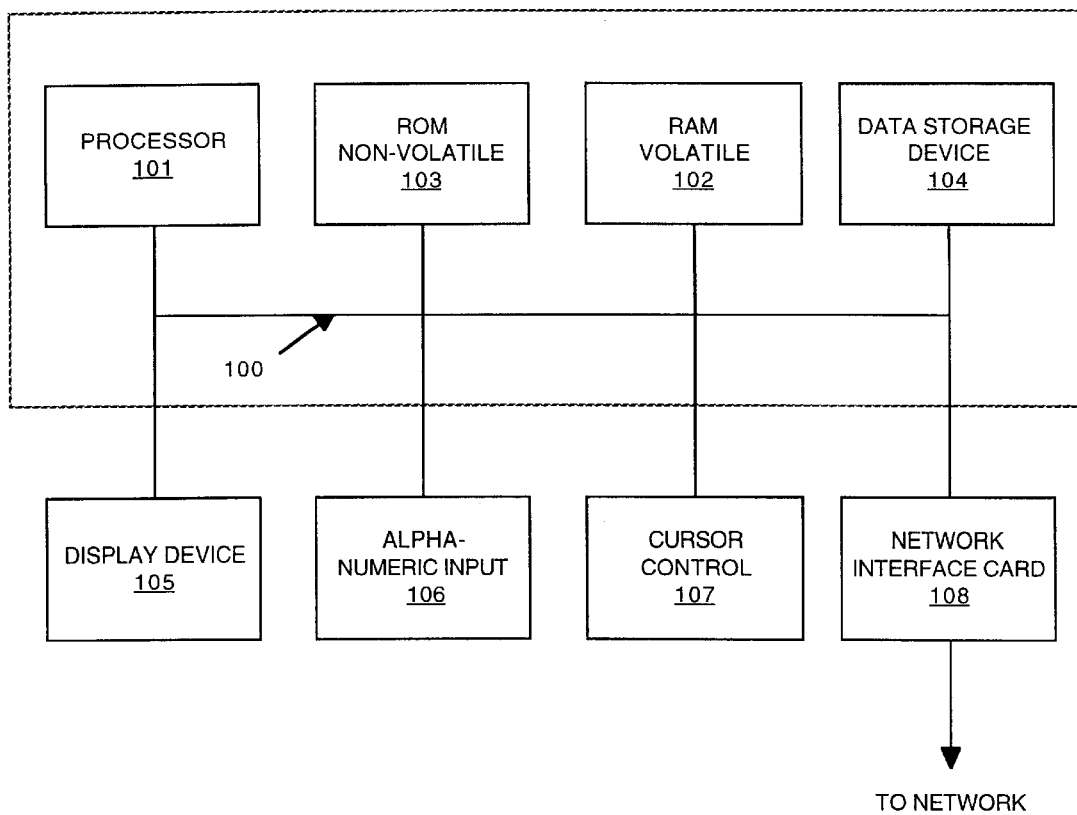
FIG. 1A is a block diagram of an exemplary computer system upon which embodiments of the present invention may be practiced.

Refer now to FIG. 1A which illustrates an exemplary computer system 190 upon which embodiments of the present invention may be practiced. In general, computer system 190 comprises bus 100 for communicating information, processor 101 coupled with bus 100 for processing information and instructions, random access (volatile) memory 102 coupled with bus 100 for storing information and instructions for processor 101, read-only (non-volatile) memory 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card (NIC) 108 is used to couple computer system 190 onto, for example, a client-server computer system network. In such a network, computer system 190 can exemplify a client computer system and/or a server computer system.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 1B:
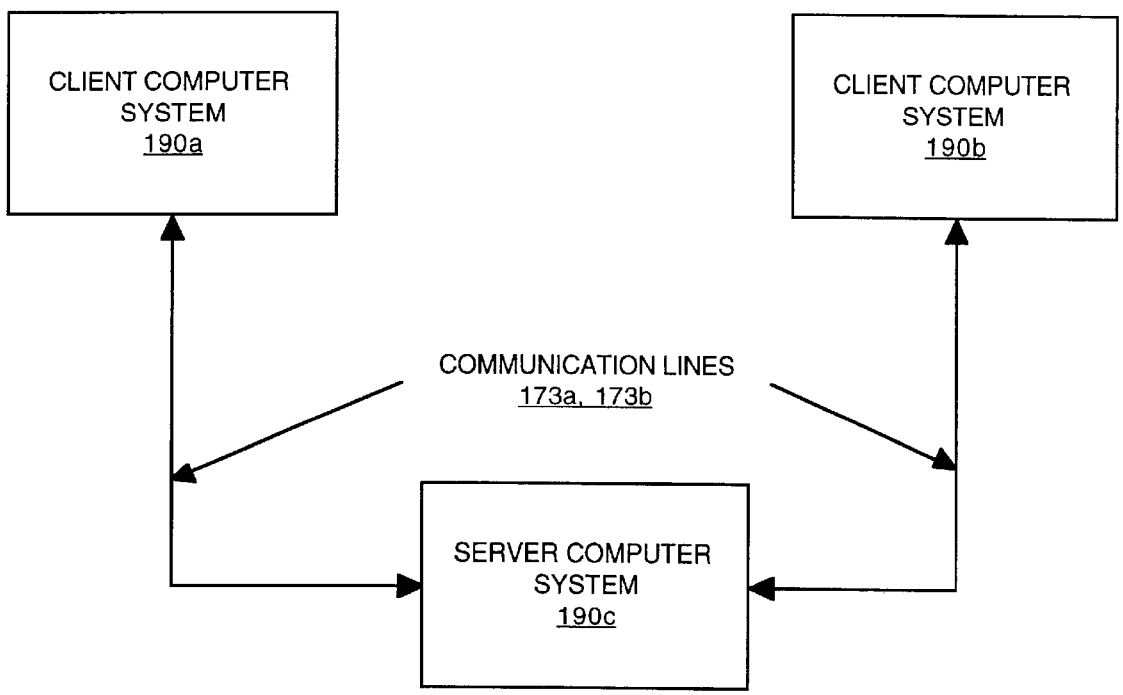
FIG. 1B is a block diagram illustrating an exemplary client-server computer system network upon which embodiments of the present invention may be practiced.

FIG. 1B is a block diagram illustrating an exemplary client-server computer system network 170 ("network 170") upon which embodiments of the present invention may be practiced. Network 170 may be a communication network located within a firewall of an organization or corporation (an "Intranet"), or network 170 may represent a portion of the World Wide Web or Internet. Client (or user) computer systems 190*a* and 190*b* and server computer system 190*c* are communicatively coupled via communication lines 173*a* and 173*b*; the mechanisms for coupling computer systems over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 190*a* and 190*b* can be coupled to server computer system 190*c* via an input/output port (e.g., a serial port) of server computer system 190*c*; that is, client computer systems 190*a* and 190*b* and server computer system 190*c* may be non-networked devices. It is appreciated that, for simplicity, only two client computer systems and a single server computer system are shown; however, it is understood that network 170 may comprise any number of client computer systems and server computer systems.

Figure 2:
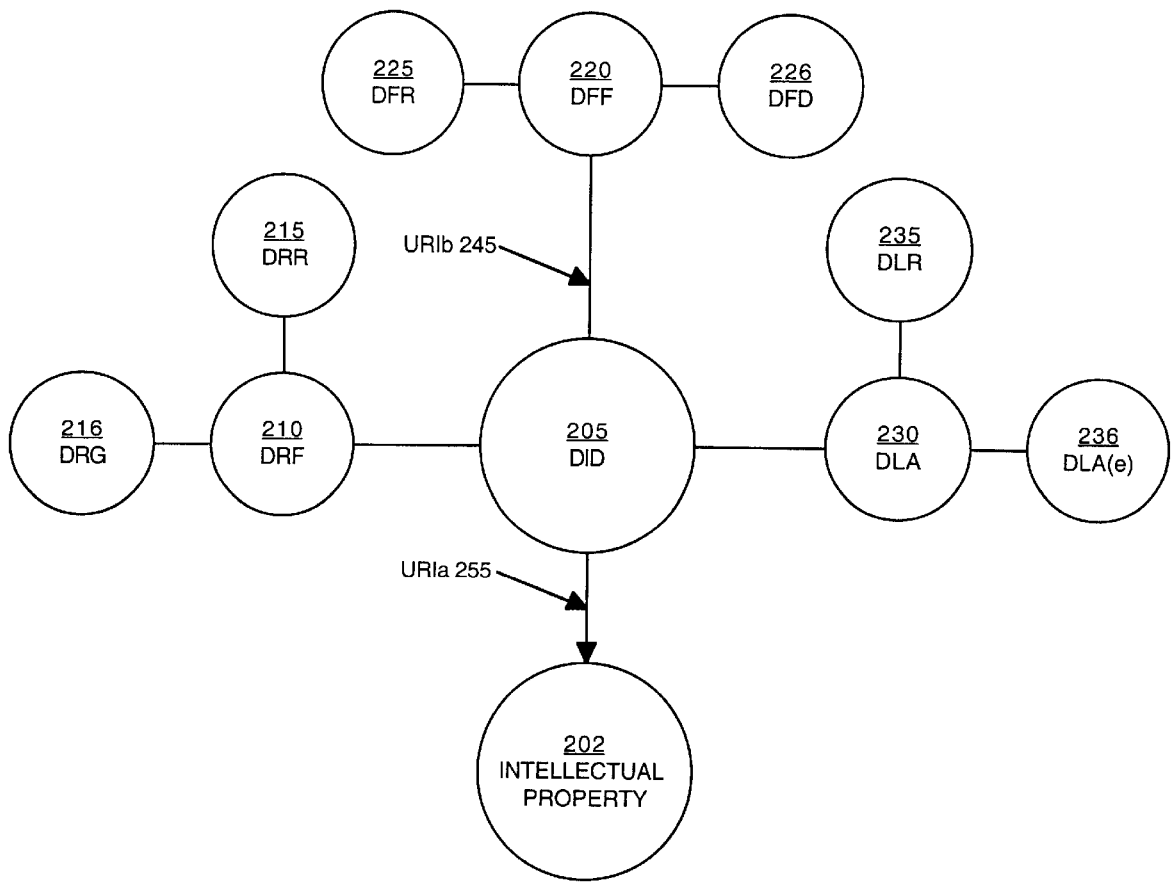
FIG. 2 shows the framework of an intellectual property management system in accordance with one embodiment of the present invention.

FIG. 2 shows the framework of an intellectual property management system 200 in accordance with one embodiment of the present invention. Intellectual property management system 200 can be implemented over the Internet (e.g., World Wide Web), over an Intranet, or using non-networked devices that are communicatively linked.

Intellectual property 202 can be either a representation or an embodiment of an intellectual property. In accordance with the present embodiment of the present invention, intellectual property 202 is assigned a unique digital identifier (DID) 205, which serves as a Uniform Resource Identifier (e.g., URIa 255) that points to intellectual property 202.

An electronic link or hyperlink is enabled between DID 205 and other intellectual property elements in order to establish the terms and conditions for accessing, using and distributing intellectual property 202. In one embodiment, different URIs (exemplified by URIb 245) may be used to point to these other intellectual property elements.

In one embodiment, digital rights framework (DRF) 210 is an intellectual property element for describing the rights granted by the intellectual property owner with regard to intellectual property 202. Digital rights request (DRR) 215 describes a request made to the owner for access to intellectual property 202 and for other rights associated with the property. Digital rights grant (DRG) 216 describes the rights granted by the owner of intellectual property 202.

In one embodiment, digital feature format (DFF) 220 is an intellectual property element for describing the features of intellectual property 202. Digital feature request (DFR) 225 describes a query made with regard to these features. DFR 225 can also describe a request to add or remove a feature of intellectual property 202. Digital feature description (DFD) 226 describes the actual product features in response to the query, or modified features in response to a request for a change in features.

In one embodiment, digital license agreement (DLA) 230 is an intellectual property element describing a licensing agreement for intellectual property 202. Digital license request (DLR) 235 describes a request made for a digital license, and DLA(e) 236 describes the actual digital license agreement made between the intellectual property owner and a licensee.

Figure 3:
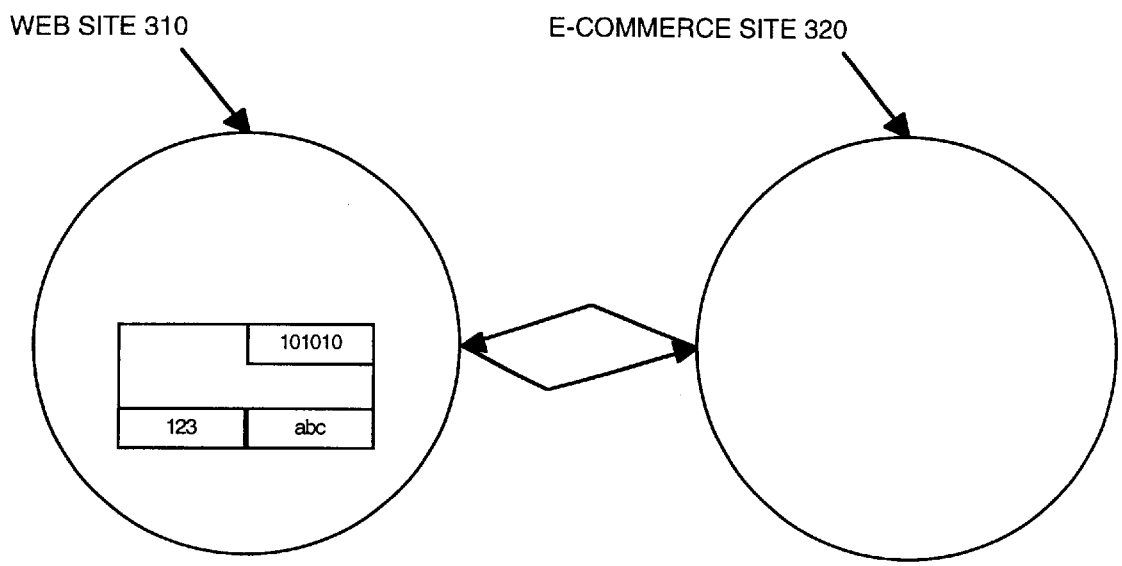
FIG. 3 is diagram exemplifying an interface between Internet sites in accordance with one embodiment of the present invention.

FIG. 3 is diagram exemplifying the interface between World Wide Web ("Web") site 310 and electronic commerce ("e-commerce") site 320 in accordance with one embodiment of the present invention. It is appreciated that, in a similar manner, this interface can occur over an Intranet or using non-networked devices that are communicatively linked.

In the present embodiment, Web site 310 includes content (e.g., intellectual property 202 of FIG. 2) that is available for sale, license, rent, etc. In one embodiment, Web site 310 and its content (including intellectual property 202) are codified using XML (Extensible Markup Language). In one embodiment, the features of intellectual property 202 are described by DFD 226 (FIG. 2).

Continuing with reference to FIG. 3, in the present embodiment, e-commerce site 320 is communicatively coupled to Web site 310 according to Internet Protocol. The content of e-commerce site 320 includes various intellectual properties for sale, rent, etc., each property perhaps described by text or accompanied by its picture. In one embodiment, e-commerce site 320 and its content are codified using XML.

In accordance with the present invention, with reference to FIGS. 2 and 3, the interface between Web site 310 and e-commerce site 320 is accomplished using intellectual property management system 200. As described above, in one embodiment, the content of Web site 310 is described by an intellectual property element such as DFF 220 (specifically, DFD 226). The owner of the content of Web site 310 grants rights and spells out limitations to the seller or licensee responsible for e-commerce site 320. In one embodiment, the rights and limitations associated with intellectual property 202 are described by an intellectual property element such as DRF 210 (specifically, DRG 216). In one embodiment, these rights and limitations are instead provided by a license described by an intellectual property element such as DLA 230 (specifically, DLA(e) 236).

Figure 4:
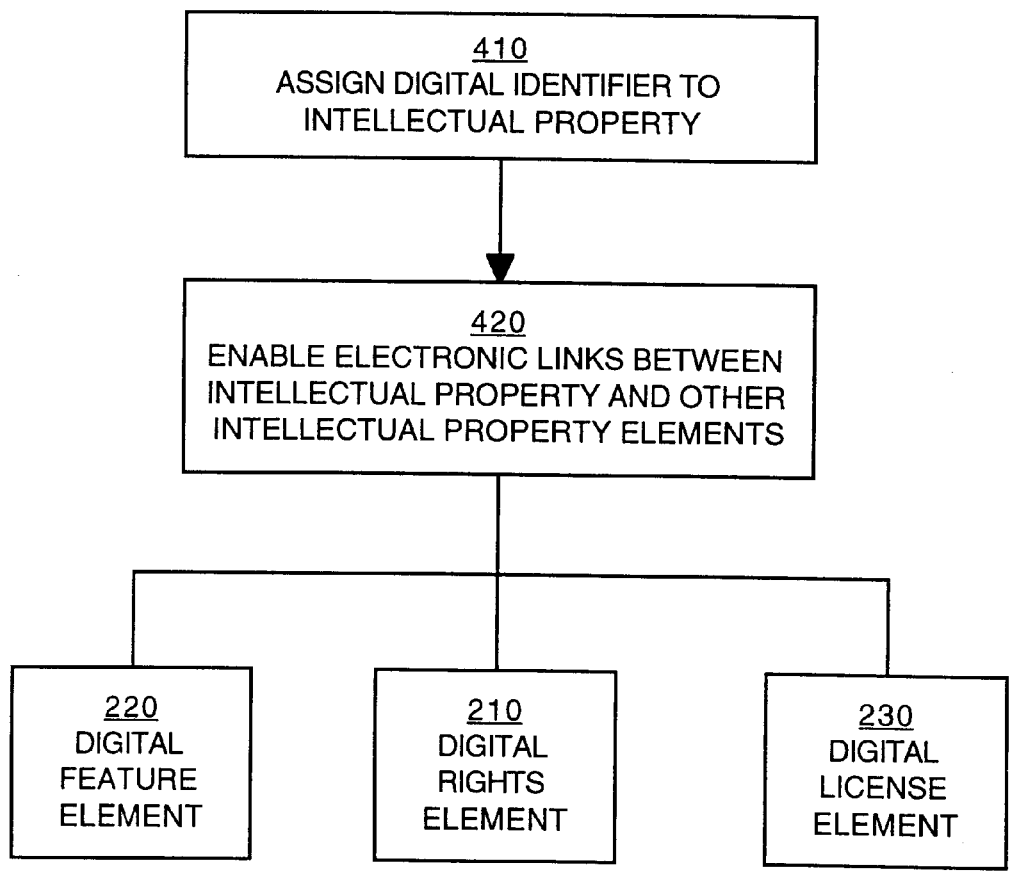
FIG. 4 is a flowchart of the steps in a process for controlling the distribution of intellectual property in accordance with one embodiment of the present invention.

FIG. 4 is a flowchart of the steps in a process for controlling the distribution of intellectual property in accordance with one embodiment of the present invention. Process 400 can be implemented via computer-readable program instructions stored in a memory unit (e.g., random access memory 102, read-only memory 103, and/or data storage device 104) and executed by processor 101 of computer system 190 (FIG. 1A). In one embodiment, process 400 is implemented via a client-server computer system network (e.g., network 170 of FIG. 1B).

In step 410 of FIG. 4, a unique digital identifier (e.g., DID 205 of FIG. 2) is assigned to an intellectual property (e.g., intellectual property 202 of FIG. 2). DID 205 serves as a URI pointing to intellectual property 202.

In step 420 of FIG. 4, electronic links or hyperlinks are enabled between intellectual property 202 and other intellectual property elements in order to model and regulate the use (or potential use) of the intellectual property (see FIG. 3). With reference also to FIG. 2, in various embodiments, the intellectual property elements include DRF 210, DFF 220 and DLA 230.

With reference again to FIGS. 2 and 3, an example illustrating the application of intellectual property management system 200 is described. Using Web site 310, intellectual property 202 is published as being offered for sale, license, or the like. A representation of intellectual property 202 is identified using DID 205, so that queries can be made with regard to the features and rights associated with the property. Using Internet Protocol, e-commerce site 320 initiates a request (e.g., DRR 215 or DLR 235) to Web site 310 regarding certain types of intellectual properties (perhaps software of for a particular application). Web site 310 responds with a list of relevant intellectual properties using their DIDs or through an XML message containing digital feature format documents (e.g., DFD 226) for the properties.

Web site 310 also can provide the terms and conditions (e.g., DRG 216 or DLA(e) 236) with regard to the sale, rent, license, etc., of the intellectual properties (or for one particular intellectual property selected by e-commerce site 320). E-commerce site 320 can review these terms and conditions and, in one embodiment, can provide them to a human user for approval. Upon approval, the agreement is returned to Web site 310 and the commercial transfer of the intellectual property is accomplished over the Internet. The agreement can also be stored electronically for further processing or for reference.

Provided below is an example of a digital license request (e.g., DLR 235) codified in XML in accordance with one embodiment of the present invention.

```
<LICENSEREQUESTS>
<DLR Type="StandardLicense">
    <Authorization Type="PSE" TimeIssued="DD-MMM-YYYY">
        <PSE>
            <SalesOrder SalesOrderNumber="NNNNNNN" SalesOrderDate="DD-MMM-YYYY"/>
            <PurchaseOrder PurchaseOrderNumber="AAAAA" PurchaseOrderDate="DD-MMM-YYYY"/>
            <DLA Type="EULA"/>
            <Order Type="Standard-NL"/>
        </PSE>
    </Authorization>
    <RequestingSystem>
        <HostName>[Host Name]</HostName>
        <ServerName>[Server Name]</ServerName>
        <Location>[Location]</Location>
    </RequestingSystem>
    <RequestingUser>
        <OrganizationName>ERP</OrganizationName>
        <UserName>[User Name]</UserName>
        <ContactEmailAddress>[Address]</ContactEmailAddress>
    </RequestingUser>
    <Product SubGroup="SCAN-PAK">
    <LineId>nnnnnnn</LineId>
    <LineNumber>1</LineNumber>
    <InventoryItemId>mmmmmmm</InventoryItemId>
    <ProductName>SW-WC1.0</ProductName>
    <ProductDescription>WebClient user license (initial minimum order)</ProductDescription>
    <OrderedQuantity>1</OrderedQuantity>
    <Licensee>
        <SiteContact/>
        <OrganizationName>[Name}</OrganizationName>
        <Address>
            <StreetAddress>
                <Line>
            </StreetAddress>
            <City/>
            <State/>
            <Province/>
            <Zip/>
            <Country/>
        </Address>
    </Licensee>
    <Intermediary>
        <SiteContact>[Name]</SiteContact>
        <OrganizationName>[Name]</OrganizationName]
        <Address>
            <StreetAddress>
                <Line>
            </StreetAddress>
            <City/>
            <State/>
            <Province/>
            <Zip/>
            <Country/>
        </Address>
    </Intermediary>
    <LicenseRequested>
        <PakParams/>
        <NumberOfLicenses>500</NumberOfLicenses>
        <LicenseParams/>
        <HostOS/>
        <HostName>[Name]</HostName>
        <HostId>nmnmnmn</HostId>
        <Pak/>
    </LicenseRequested>
```

-continued

```
        <LicenseDispatch>
            <EmailAddress>[Address]</EmailAddress>
            <OutboundDir/>
        </LicenseDispatch>
    </Product>
</DLR>
</LICENSEREQUESTS>
```

Provided below is an example of a digital license agreement (e.g., DLA(e) 236) codified in XML in accordance with one embodiment of the present invention.

```
<DLA version="1.0">
    <License Type="[EULA|ILA]"
            Description="[End User License Agreement|Intermediary License Agreement]"
            DLANumber="[DLANumber]">
        <Authorization Type="PSE" Description="Product Sales Entitlement">
            <PSE>
                <SalesOrder SONumber=""SDDate=""/>
                <PurchaseOrder PONumber=""PODate+""/>
                <Order Type="[Resale|Internal]"/>
            </PSE>
        </Authorization>
        <Agreement>
            <Licensor>
            </Licensor>
            <Intermediary>
            </Intermediary>
            <Licensee>
            </Licensee>
        </Agreement>
        <TermsAndConditions>
            <LicensePeriod Type="]Perpetual|Limited[">
                <StartDate>[YYYY-MM-DDTHH:MM-GGGG]</StartDate>
                <TerminalDate>[YYYY-MM-DDTHH:MM-GGGG]</TerminalDate>
            </LicensePeriod>
        </TermsAndConditions>
        <ProductList>
            <Product ProductLineNo=""ProductName=""ProductDesc=""ProductQty=""ProductLicenseID="">
            </Product>
            <Product ProductLineNo=""ProductName=""ProductDesc=""ProductQty=""ProductLicenseID="">
                <ProductOrderAttributes>
                    <PakParams>                          </PakParams>
                    <LicenseBlocks>[CSV numerical values]</LicenseBlocks>
                    <LicenseParams>                      </LicenseParams>
                    <HostOS>                             </HostOS>
                    <HostName>                           </HostName>
                    <HostID>                             </HostID>
                    <ChassisID>                          </ChassisID>
                    <Pak>                                </Pak>
                </ProductOrderAttributes>
            </Product>
        </ProductList>
        <LicenseKeyList>
            <LicenseKey ProductLicenseID="">
            <LicenseKeyDescription>[License Key Description</LicenseKeyDescription>
            <LicenseKeyValue>[ License Key Value]</LicenseKeyValue>
            <LicenseKeyHref="[URI]">[Description of URI]</LicenseKeyHref>
        </LicenseKeyList>
        <InstallationInstructions ProductLicenseID="">
            <TextInstructionBlock>
            </TextInstructionBlock>
        </InstallationInstructions>
    </License>
</DLA>
```

Regarding the example DLA codified above, the authorization key may be a public key, a digital certificate, or some other form of authentication. The "intermediary" block is used in cases of an Intermediary License Agreement or a channel-delivered EULA (End User License Agreement). In the "terms and conditions" block, legal terms of the agreement are included and can be an ASCII text block, HTML (HyperText Markup Language) or XML formatted text, or an external reference via URI to other local or remote documents. The terms and conditions are included for the elements listed in the "product list" block. The product list can be reiterated from the DLR. The products can include a list of character-data license key values or an external pointer to an associated file which contains license-related data. The "product license ID" attribute is a local file reference to the "license key" element.

In summary, the present embodiment of the present invention provides a method and system thereof for controlling and regulating the distribution of intellectual properties using Internet Protocol along with controlling processes and applications. Instead of treating the transaction of intellectual properties as a general transfer of data and data communications, in accordance with the present invention the acts of communication and the communicated data itself are treated as forms of intellectual property rights and intellectual properties. The present invention provides a method and system thereof for declaring rights to an intellectual property and for granting those rights to a purchaser or licensee, in order to more effectively protect the property rights of the intellectual property owner.

In accordance with the present invention, all forms of intellectual property can use a common series of extensible languages (e.g., XML) and control systems to request and respond to requests for access, control, ownership, rights of use or reuse, etc., and to enable network and automatic computerized actions regarding the distribution of the intellectual property once the rights of access have been established and accepted. For example, the intellectual property management system of the present invention can be applied to the distribution of software over the Internet.

In addition to application in the software industry, the present invention can be extended to the telecommunications industry, which has embodiments and representations of rights of access or use of a network as well as intellectual properties such as pay-per-view movies and events. Similarly, the present invention can be extended to general content media properties, such as music or other audio, video and film, written literature, news, specialized data and information sources such as medical and financial records, and so on.

The present invention thus provides a method and system thereof that can control the identification, negotiation, establishment, and transaction of intellectual properties (embodiments and representations) over the Internet, as well as over internal company computer system networks (Intranets or the like) or using non-networked devices. The present invention furthermore provides a method and system thereof that can facilitate the legal and commercial aspects of intellectual property transactions, in order to reduce the delay in the delivery and use of the intellectual property by a purchaser or licensee, and to reduce the delay in the receipt of payments or royalties due to the seller or licensor.

The preferred embodiment of the present invention, intellectual property over Internet Protocol framework, is thus described. While the present invention has been described in particular embodiments, it should be appreciated that the present invention should not be construed as limited by such embodiments, but rather construed according to the following claims.

What is claimed is:

1. A method for controlling the electronic distribution of intellectual property, said method comprising the computer-implemented steps of:

a) assigning a unique digital identifier to an intellectual property, said digital identifier providing an address for locating said intellectual property using Internet Protocol; and b) enabling electronic links between said intellectual property and other intellectual property elements, said other intellectual property elements establishing terms for accessing said intellectual property.

2. The method for controlling the electronic distribution of intellectual property as recited in claim 1 wherein said step a) further comprises:

codifying said intellectual property using XML (Extensible Markup Language).

3. The method for controlling the electronic distribution of intellectual property as recited in claim 1 wherein said step b) further comprises:

assigning a unique digital identifier to each of said other intellectual property elements.

4. The method for controlling the electronic distribution of intellectual property as recited in claim 1 wherein said step b) comprises:

enabling hyperlinks between said intellectual property and said other intellectual property elements.

5. The method for controlling the electronic distribution of intellectual property as recited in claim 1 further comprising the step of:

enabling by reference to said digital identifier an electronic link to a digital feature element describing features of said intellectual property.

6. The method for controlling the electronic distribution of intellectual property as recited in claim 1 further comprising the step of:

enabling by reference to said digital identifier an electronic link to a digital rights element describing legal rights and limitations associated with said intellectual property.

7. The method for controlling the electronic distribution of intellectual property as recited in claim 1 further comprising the step of:

enabling by reference to said digital identifier an electronic link to a digital license element providing a license for said intellectual property.

8. A method for electronically distributing intellectual property, said method comprising the computer-implemented steps of:

a) locating an intellectual property using Internet Protocol, said intellectual property having a unique digital identifier, said digital identifier providing an address for said intellectual property;

b) using an electronic link to access other intellectual property elements, said other intellectual property elements establishing terms for accessing said intellectual property; and c) accessing said intellectual property in accordance with said terms.

9. The method for electronically distributing intellectual property as recited in claim 8 wherein said intellectual property is codified using XML (Extensible Markup Language).

10. The method for electronically distributing intellectual property as recited in claim 8 wherein said step b) further comprises:

locating said other intellectual property elements using a unique digital identifier assigned to each of said other intellectual property elements.

11. The method for electronically distributing intellectual property as recited in claim 8 wherein said step b) comprises:

using a hyperlink to access said other intellectual property elements.

12. The method for electronically distributing intellectual property as recited in claim 8 wherein said step b) comprises:

accessing a digital feature element describing features of said intellectual property.

13. The method for electronically distributing intellectual property as recited in claim 8 wherein said step b) comprises:

accessing a digital rights element describing legal rights and limitations associated with said intellectual property.

14. The method for electronically distributing intellectual property as recited in claim 8 wherein said step b) comprises:

accessing a digital license element providing a license for said intellectual property.

15. A computer system comprising:

a bus;

a processor coupled to said bus; and a memory unit coupled to said bus, said processor for executing a method for controlling the electronic distribution of intellectual property, said method comprising the steps of:

a) assigning a unique digital identifier to an intellectual property, said digital identifier providing an address for locating said intellectual property using Internet Protocol; and b) enabling electronic links between said intellectual property and other intellectual property elements, said other intellectual property elements establishing terms for accessing said intellectual property.

16. The computer system of claim 15 wherein said intellectual property is codified using XML (Extensible Markup Language).

17. The computer system of claim 15 wherein said other intellectual property elements are each assigned a unique digital identifier.

18. The computer system of claim 15 wherein said electronic links are hyperlinks.

19. The computer system of claim 15 wherein said processor performs said method for controlling the electronic distribution of intellectual property further comprising the step of:

enabling by reference to said digital identifier an electronic link to a digital feature element describing features of said intellectual property.

20. The computer system of claim 15 wherein said processor performs said method for controlling the electronic distribution of intellectual property further comprising the step of:

enabling by reference to said digital identifier an electronic link to a digital rights element describing legal rights and limitations associated with said intellectual property.

21. The computer system of claim 15 wherein said processor performs said method for controlling the electronic distribution of intellectual property further comprising the step of:

enabling by reference to said digital identifier an electronic link to a digital license element providing a license for said intellectual property.

22. A computer-usable medium having computer-readable program code embodied therein for causing a computer system to perform the steps of:

a) assigning a unique digital identifier to an intellectual property, said digital identifier providing an address for locating said intellectual property using Internet Protocol; and b) enabling electronic links between said intellectual property and other intellectual property elements, said other intellectual property elements establishing terms for accessing said intellectual property.

23. The computer-usable medium of claim 22 wherein said computer-readable program code embodied therein causes a computer system to perform the step of:

codifying said intellectual property using XML (Extensible Markup Language).

24. The computer-usable medium of claim 22 wherein said computer-readable program code embodied therein causes a computer system to perform the step of:

assigning a unique digital identifier to each of said other intellectual property elements.

25. The computer-usable medium of claim 22 wherein said computer-readable program code embodied therein causes a computer system to perform the step of:

enabling hyperlinks between said intellectual property and said other intellectual property elements.

26. The computer-usable medium of claim 22 wherein said computer-readable program code embodied therein causes a computer system to perform the step of:

enabling by reference to said digital identifier an electronic link to a digital feature element describing features of said intellectual property.

27. The computer-usable medium of claim 22 wherein said computer-readable program code embodied therein causes a computer system to perform the step of:

enabling by reference to said digital identifier an electronic link to a digital rights element describing legal rights and limitations associated with said intellectual property.

28. The computer-usable medium of claim 22 wherein said computer-readable program code embodied therein causes a computer system to perform the step of:

enabling by reference to said digital identifier an electronic link to a digital license element providing a license for said intellectual property.

\* \* \* \* \*